US012784462B2

(12) United States Patent
Sakamoto et al.

(10) Patent No.: US 12,784,462 B2
(45) Date of Patent: Nov. 3, 2026

(54) IMAGE PROCESSING DEVICE AND IMAGE PROCESSING METHOD

(71) Applicant: Astemo, Ltd., Tokyo (JP)

(72) Inventors: Shoichi Sakamoto, Hitachinaka (JP); Naoya Tada, Hitachinaka (JP); Hiroto Mitoma, Hitachinaka (JP)

(73) Assignee: Astemo, Ltd., Tokyo (JP)

( * ) Notice: Subject to any disclaimer, the term of this patent is extended or adjusted under 35 U.S.C. 154(b) by 0 days.

(21) Appl. No.: 19/141,837

(22) PCT Filed: Jan. 11, 2023

(86) PCT No.: PCT/JP2023/000459
§ 371 (c)(1),
(2) Date: Jun. 20, 2025

(87) PCT Pub. No.: WO2024/150330
PCT Pub. Date: Jul. 18, 2024

(65) Prior Publication Data

US 2026/0220946 A1 Jul. 30, 2026

(51) Int. Cl.
*G06V 20/56* (2022.01)
*G06T 7/20* (2017.01)
(Continued)

(52) U.S. Cl.
CPC ................ *G06V 20/56* (2022.01); *G06T 7/20* (2013.01); *G06V 10/46* (2022.01); *G06V 10/60* (2022.01);
(Continued)

(58) Field of Classification Search
None
See application file for complete search history.

(56) References Cited

U.S. PATENT DOCUMENTS

| | | | |
|---|---|---|---|
| 9,616,856 | B2 | 4/2017 | Irie et al. |
| 10,045,002 | B2 | 8/2018 | Nishijima |

(Continued)

FOREIGN PATENT DOCUMENTS

| | | |
|---|---|---|
| JP | 2014-027539 A | 2/2014 |
| JP | 2017-058949 A | 3/2017 |

OTHER PUBLICATIONS

International Search Report and Written Opinion with English translations of International Application No. PCT/JP2023/000459 dated Apr. 11, 2023 (9 pages).

*Primary Examiner* — Heather R Jones
(74) *Attorney, Agent, or Firm* — Foley & Lardner LLP

(57) ABSTRACT

An object is to detect generation of a light streak regardless of a direction in which the light streak extends. An image processing device includes a light spot detection unit, a light streak candidate extraction unit, and a light streak presence/absence determination unit. The light spot detection unit detects a light spot having a luminance value larger than or equal to a predetermined value from an image acquired by a camera mounted in a vehicle. The light streak candidate extraction unit extracts a light streak candidate extending from the light spot detected by the light spot detection unit. The light streak presence/absence determination unit determines that the light streak candidate is a light streak when a difference in angle between a portion of the light streak candidate extending from the light spot to one side and a portion of the light streak candidate extending from the light spot to the other side is within a predetermined range.

10 Claims, 8 Drawing Sheets

(51) Int. Cl.
*G06V 10/46* (2022.01)
*G06V 10/60* (2022.01)
*G06V 10/80* (2022.01)

(52) U.S. Cl.
CPC .. *G06V 10/817* (2022.01); *G06T 2207/20132* (2013.01); *G06V 2201/07* (2022.01)

(56) References Cited

U.S. PATENT DOCUMENTS

| | | | | |
|---|---|---|---|---|
| 2015/0203076 | A1 | 7/2015 | Irie et al. | |
| 2017/0076463 | A1* | 3/2017 | Nishijima ............ | H04N 13/254 |
| 2020/0361375 | A1* | 11/2020 | Mano ..................... | B60K 35/28 |
| 2021/0031675 | A1* | 2/2021 | Shibata ..................... | F21V 7/00 |
| 2025/0264775 | A1* | 8/2025 | Wang ................... | G03B 11/043 |

* cited by examiner

IMAGE WHEN LIGHT STREAK IS NOT GENERATED

IMAGE WHEN LIGHT STREAK IS GENERATED

IMAGE BEFORE BINARIZATION

IMAGE AFTER BINARIZATION

FIG. 6A
IMAGE AFTER CONTOUR TRACKING
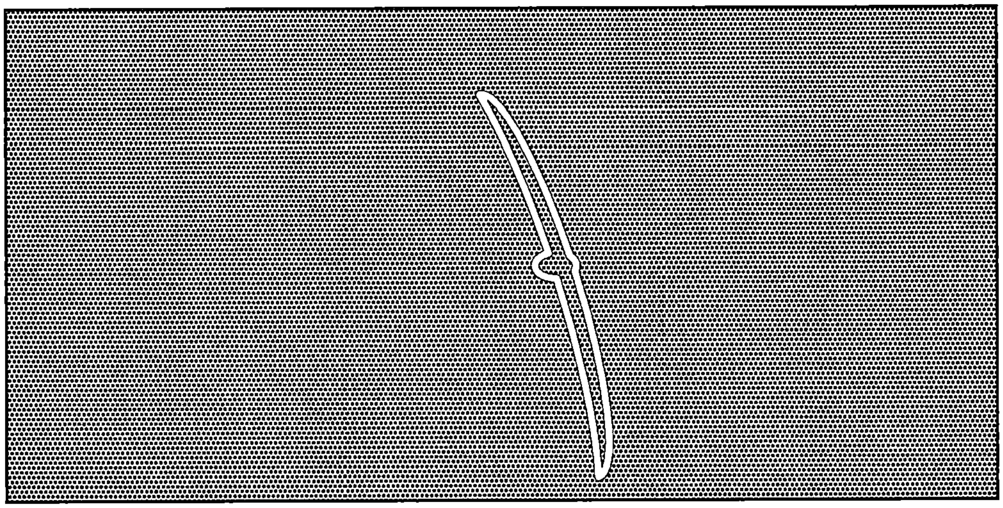
IMAGE AFTER CUTTING OUT
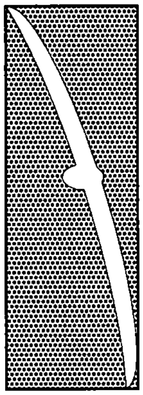
FIG. 6B

IMAGE PROCESSING DEVICE AND IMAGE PROCESSING METHOD

TECHNICAL FIELD

The present invention relates to an image processing device and an image processing method.

BACKGROUND ART

In recent years, a technique for recognizing images captured by cameras (in-vehicle cameras) has been widely used for automatic driving of vehicles (automobiles). The cameras are installed, for example, inside windshields. Therefore, image processing devices may not be able to normally recognize surrounding environments of the vehicles due to dirt on the windshields. For example, in a case where there is a portion that is not wiped by wipers on the windshield, or in a case where there is a scratch on the windshield, when strong light hit the windshield at the time of capturing an image, light extending in a streak shape along the unwiped portion or the scratch (light streak) is captured.

PTL 1 describes an object recognition device and a dirt detection method using an image captured by a stereo camera that captures an image of the outside of a vehicle such as an automobile from the interior of the vehicle through a window glass. The object recognition device described in PTL 1 detects an edge extending in a direction intersecting the wiping direction of wipers, and determines that a windshield is in a dirty state when the edge is continuously detected together with a light source detection result.

CITATION LIST

Patent Literature

PTL 1: JP 2017-58949 A

SUMMARY OF INVENTION

Technical Problem

However, in the object recognition device described in PTL 1, it is necessary to set in advance a specific direction intersecting the wiping direction of the wipers. Therefore, the specific direction needs to be set for each vehicle that is different in wiping directions of wipers.

In addition, a light streak captured due to an unwiped portion on the windshield in a case where the windshield is wiped by something other than the wipers or a scratch of the windshield may not have an edge appearing in a direction intersecting the wiping direction of the wipers. Therefore, the object recognition device described in PTL 1 cannot detect a light streak extending in a direction other than the wiping direction of the wipers.

In consideration of the aforementioned problem, an object of the present invention is to provide an image processing device and an image processing method capable of detecting generation of a light streak regardless of a direction in which the light streak extends.

Solution to Problem

In order to solve the aforementioned problem and achieve the object, an image processing device according to an aspect of the present invention includes a light spot detection unit, a light streak candidate extraction unit, and a light streak presence/absence determination unit. The light spot detection unit detects a light spot having a luminance value larger than or equal to a predetermined value from an image acquired by a camera mounted in a vehicle. The light streak candidate extraction unit extracts a light streak candidate extending from the light spot detected by the light spot detection unit. The light streak presence/absence determination unit determines that the light streak candidate is a light streak when a difference in angle between a portion of the light streak candidate extending from the light spot to one side and a portion of the light streak candidate extending from the light spot to the other side is within a predetermined range.

Advantageous Effects of Invention

According to one aspect of the present invention, it is possible to detect generation of a light streak regardless of a direction in which the light streak extends.

Problems, configurations, and effects other than those described above will be apparent from the following description of the embodiment.

BRIEF DESCRIPTION OF DRAWINGS

FIGS. 6A and 6B are diagrams each for explaining a cut-out image according to an embodiment.

DESCRIPTION OF EMBODIMENTS

1. Embodiment

Figure 1:
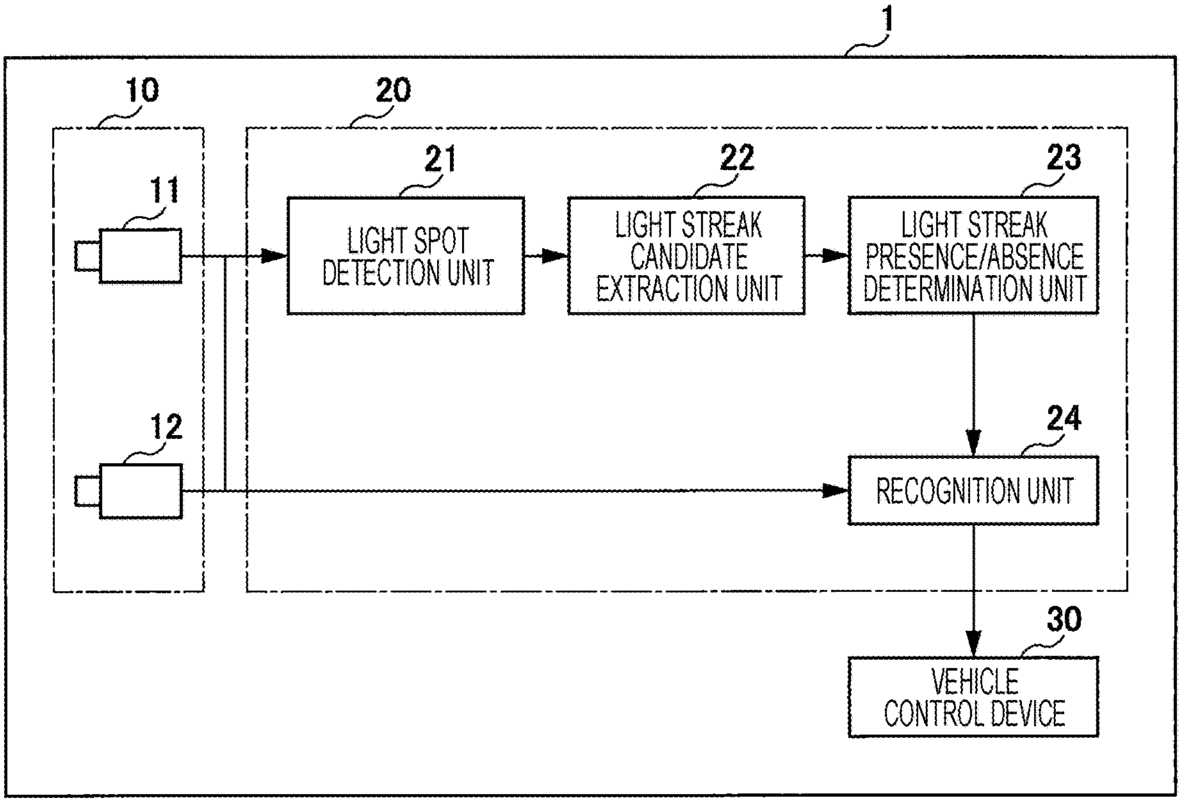
FIG. 1 is a schematic configuration diagram illustrating a configuration of a vehicle in which an image processing device according to an embodiment is mounted.

Hereinafter, an image processing device and an image processing method according to an embodiment will be described with reference to FIGS. 1 to 9. In the drawings, the same reference numerals are given to common parts.

[Example of Configuration of Vehicle]

First, a configuration of a vehicle in which an image processing device according to an embodiment is mounted will be described with reference to FIG. 1.

FIG. 1 is a schematic configuration diagram illustrating a configuration of a vehicle in which an image processing device is mounted.

As illustrated in FIG. 1, an in-vehicle camera 10, an image processing device 20, and a vehicle control device 30 are mounted on a vehicle (automobile) 1. The image processing device 20 recognizes a target outside the vehicle from an image acquired (captured) by the in-vehicle camera 10. A recognition result of the image processing device 20 is transmitted to the vehicle control device 30. The vehicle control device 30 implements driving assistance functions such as adaptive cruise control (ACC) and autonomous emergency braking (AEB).

The in-vehicle camera 10 includes a plurality of imaging devices arranged at predetermined intervals in a vehicle width direction inside a windshield. The plurality of imaging devices are installed around the vehicle 1 in a predetermined direction, for example, toward the front of the vehicle 1. Hereinafter, the in-vehicle camera 10 will be described as a stereo camera including two cameras, a left camera 11 and a right camera 12. Note that the in-vehicle camera may include three or more cameras.

The left camera 11 and the right camera 12 of the in-vehicle camera 10 capture images of areas ahead of the front of the vehicle 1. The images captured by the in-vehicle camera 10 are supplied to the image processing device 20.

The image processing device 20 includes hardware such as a central processing unit (CPU), a read only memory (ROM), a random access memory (RAM), and an electronic circuit, and software for performing image recognition processing in cooperation with the hardware. That is, the CPU reads various processing programs stored in the ROM, develops the programs into the RAM, and controls the image recognition processing according to the developed programs.

The image processing device 20 performs image correction processing such as camera calibration and distortion correction on the captured image. Then, a target such as an object or a person is recognized from the image subjected to the image correction processing. In addition, the image processing device 20 detects a light streak from the captured image. A light spot detection unit 21, a light streak candidate extraction unit 22, a light streak presence/absence determination unit 23, and a recognition unit 24 are included.

The light spot detection unit 21 analyzes pixel values (luminance values) in the image captured by the in-vehicle camera 10 using a known technique. Then, the light spot detection unit 21 detects a position (light spot) of a light source on the image. As the light spot, for example, one spot having the highest luminance among spots with high luminance having pixel values of 200 or more or one spot from a strong light source such as a headlight or a street lamp is detected. Note that the light spot is not limited to one spot, and a plurality of light spots may be selected (detected). The light spot detection unit 21 outputs a detection result to the light streak candidate extraction unit 22.

The light streak candidate extraction unit 22 extracts a straight line that is a candidate of a light streak, with the light spot acquired by the light spot detection unit 21 as a reference. Usually, a portion that is not wiped by wipers, which causes a light streak, has an arc shape, but can be approximated to a straight line. Therefore, the light streak candidate extraction unit 22 extracts one of the straight lines passing through the light source as a light streak candidate straight line. The light streak candidate extraction unit 22 outputs an extraction result to the light streak presence/absence determination unit 23.

The light streak presence/absence determination unit 23 determines whether there is a light streak using whether the light streak candidate straight line acquired by the light streak candidate extraction unit 22 is point-symmetric and other auxiliary information. Examples of the other auxiliary information include a thickness of a light streak candidate straight line to be described later, and vehicle information such as a speed of the vehicle 1 and whether wipers are used.

For example, in a case where a light streak is present in a plurality of consecutive frames, the light streak presence/absence determination unit 23 outputs the detection of the light streak to the recognition unit 24. Upon receiving the detection of the light streak from the light streak presence/absence determination unit 23, the recognition unit 24 outputs the detection of the light streak to the vehicle control device 30 to stop the driving assistance functions of the light streak presence/absence determination unit 23.

The recognition unit 24 detects (recognizes) a target such as a vehicle or a pedestrian in the surrounding environment (here, ahead) from the image captured by the in-vehicle camera 10. The recognition unit 24 outputs a target recognition result to the vehicle control device 30.

The vehicle control device 30 includes hardware such as a central processing unit (CPU), a read only memory (ROM), a random access memory (RAM), and an electronic circuit, and software for performing vehicle control processing including driving assistance functions in cooperation with the hardware. That is, the CPU reads various processing programs stored in the ROM, develops the programs into the RAM, and controls the vehicle control process according to the developed programs.

The vehicle control device 30 acquires the target recognition result from the recognition unit 24 as information necessary for automatic driving and the like, and controls the traveling state of the vehicle 1. The vehicle control device 30 controls, for example, a braking operation for avoiding contact with an object or a person in front of the vehicle 1, a steering operation for traveling at a speed to follow another vehicle in front of the vehicle 1 or for traveling while following a lane of a road on which the vehicle is traveling.

[Operation of Wipers]

Next, a wiper operation will be described with reference to FIG. 2.

Figure 2:
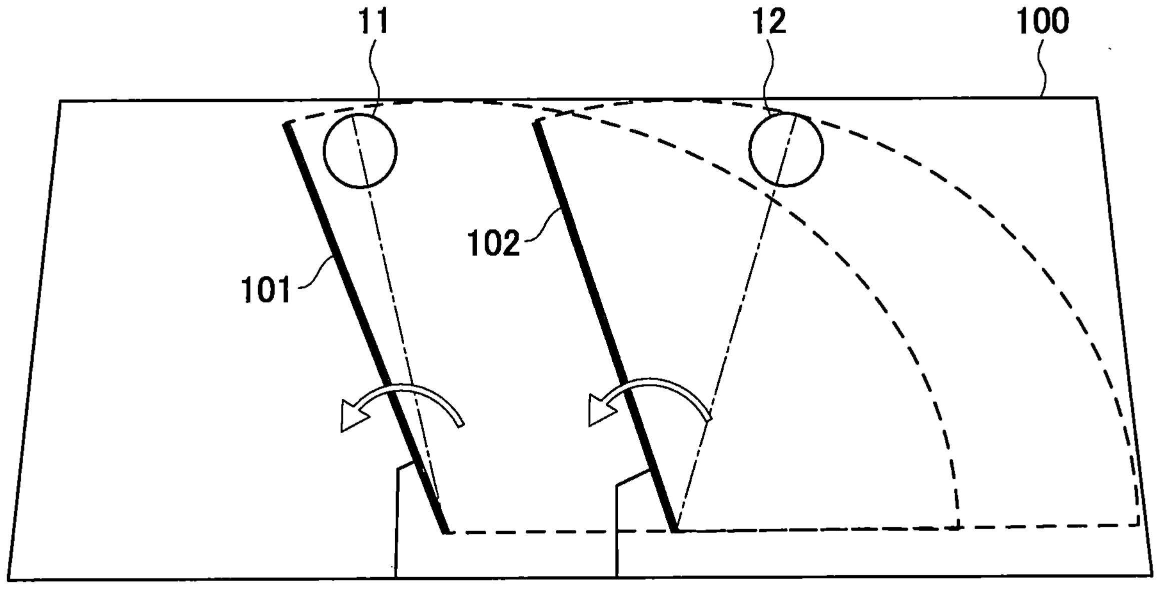
FIG. 2 is a diagram for explaining a wiper operation of the vehicle.

FIG. 2 is a diagram for explaining a wiper operation of the vehicle 1.

As illustrated in FIG. 2, wipers 101 and 102 are installed on the vehicle 1. The wipers 101 and 102 wipe a windshield 100 located in front of the left and right cameras 11 and 12. When the wipers 101 and 102 operate, a thin unwiped portion may occur as indicated by an alternate long and short dash line.

In a case where the outside world is bright in the daytime or in a case where there is no light source in the outside world at night, the portion that is not wiped by the wipers does not cause light streaks in images captured by the left and right cameras 11 and 12. However, in a case where there is a light source in the outside world at night, light from the light source extends due to an unwiped portion, generating a light streak.

[Generation of Light Streak]

Next, an image in which a light streak is generated will be described with reference to FIG. 3.

FIG. 3 is a diagram for explaining an image in a state where a light streak has been generated.

Figure 3A:
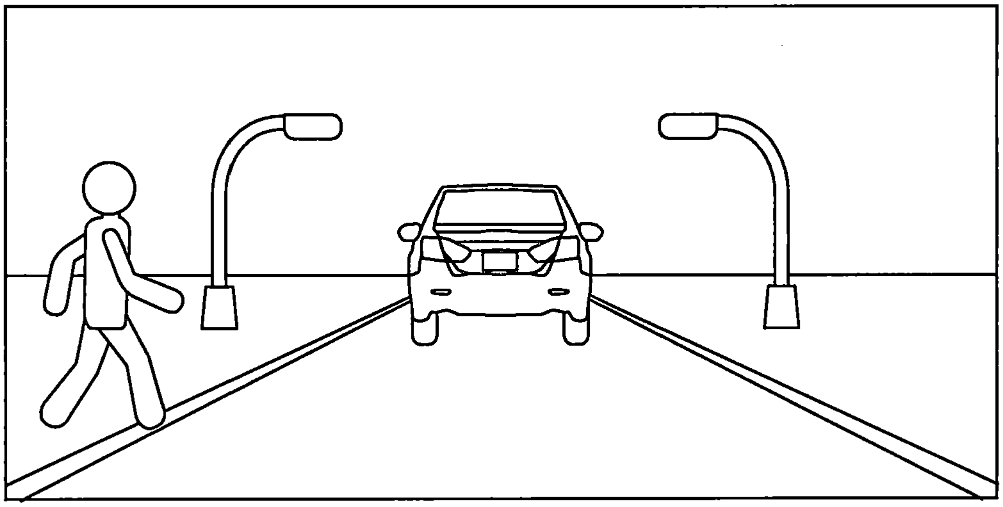
FIGS. 3A and 3B are diagrams each for explaining an image in a state where a light streak has been generated.

FIG. 3A is a schematic view illustrating a state in which there is no dirt or scratch such as a portion that is not wiped by wipers, and no light streak is generated in an image at night. As illustrated in FIG. 3A, in a case where there is no dirt or scratch such as a portion that is not wiped by wipers, no light streak is generated in a captured image even if there is a light source.

Figure 3B:
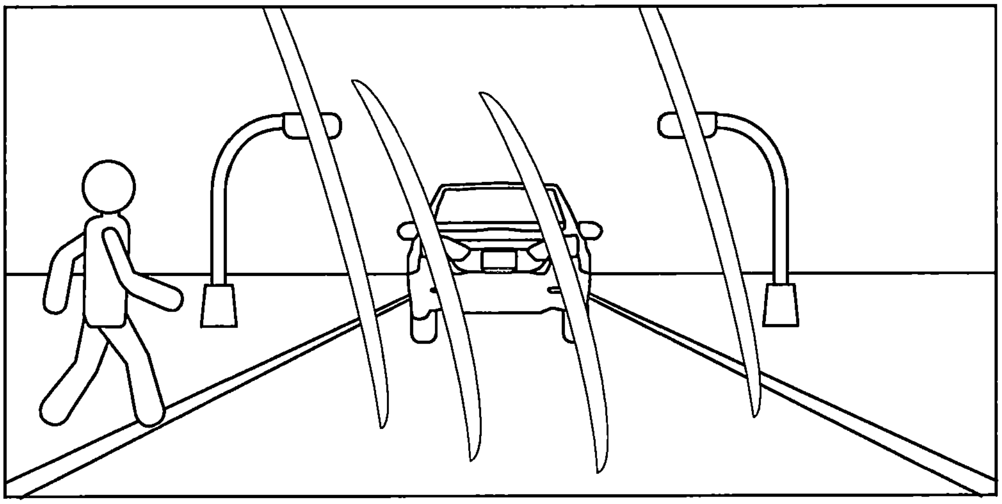

FIG. 3B is a schematic view illustrating a state in which a portion that is not wiped by wipers, and a light streak has been generated in an image at night. As illustrated in FIG. 3B, a target that is not a strong light source such as a pedestrian is imaged without any problem. However, light from a light source such as a headlight or a brake lamp of an automobile or a street lamp extends, generating a light streak. A light streak generated by a scratch on the windshield or a portion that is not wiped by something other than the wipers extends at an angle (direction) different from a light streak generated by a portion that is not wiped by the wipers.

[Light Streak Detection Processing]

Next, light streak detection processing performed by the image processing device 20 will be described with reference to FIG. 4.

Figure 4:
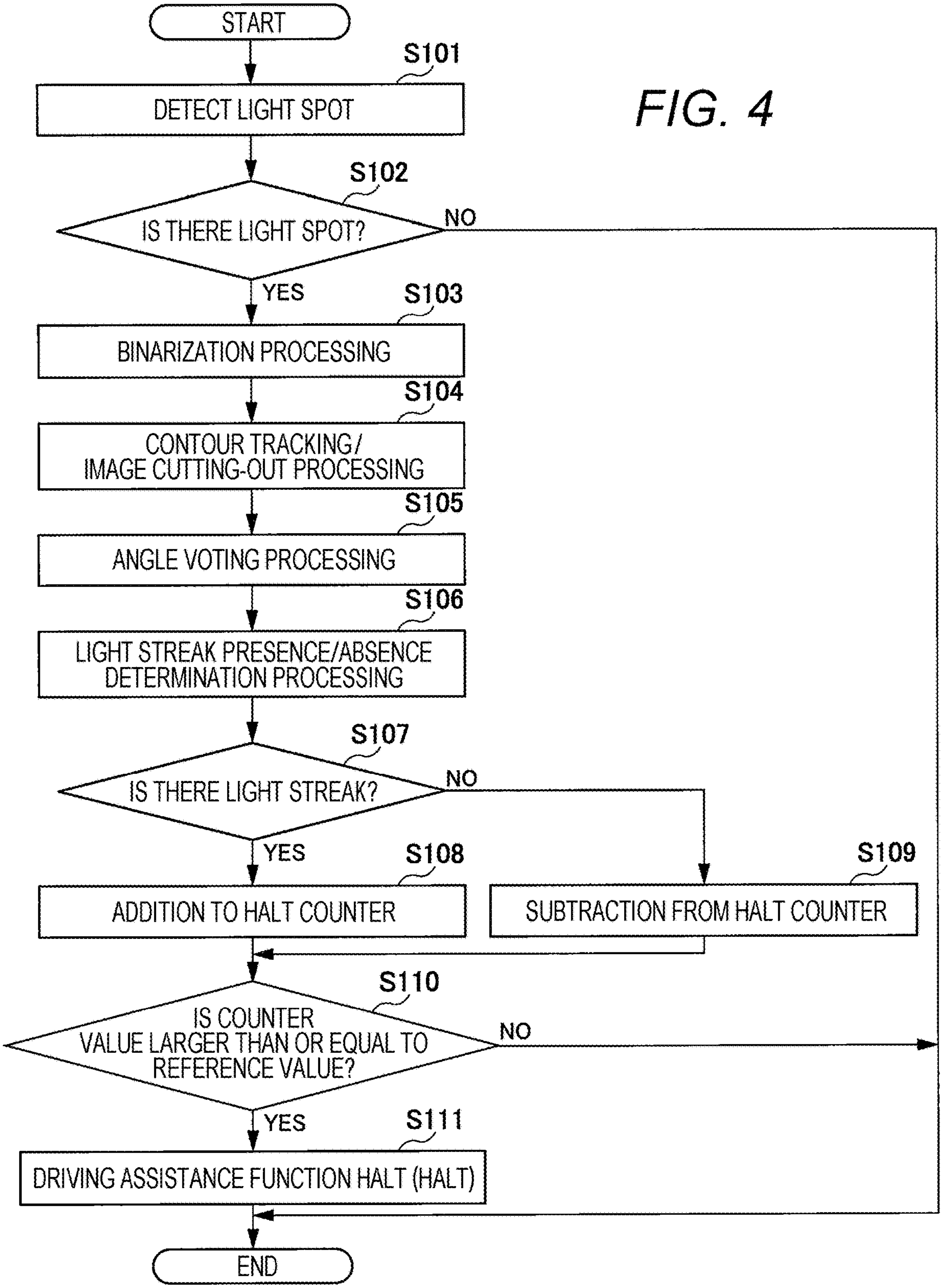
FIG. 4 is a flowchart illustrating an example of light streak detection processing according to an embodiment.

FIG. 4 is a flowchart illustrating an example of light streak detection processing.

First, the light spot detection unit 21 of the image processing device 20 detects a light spot from an image transmitted from the in-vehicle camera 10 (S101). In step S101, the light spot detection unit 21 analyzes pixel values (luminance values) in the image using a known technique, and detects a position (light spot) of a light source on the image.

Next, the light spot detection unit 21 determines whether there is a light spot (S102). When it is determined in step S102 that there is no light spot (NO in S102), the light spot detection unit 21 (image processing device 20) ends the light streak detection processing.

When it is determined in step S102 that there is a light spot (YES in S102), the light spot detection unit 21 transmits a detection result to the light streak candidate extraction unit 22. The light streak candidate extraction unit 22 performs binarization processing on the image, with the luminance value of the detected light spot as a reference (S103).

Figure 5A:
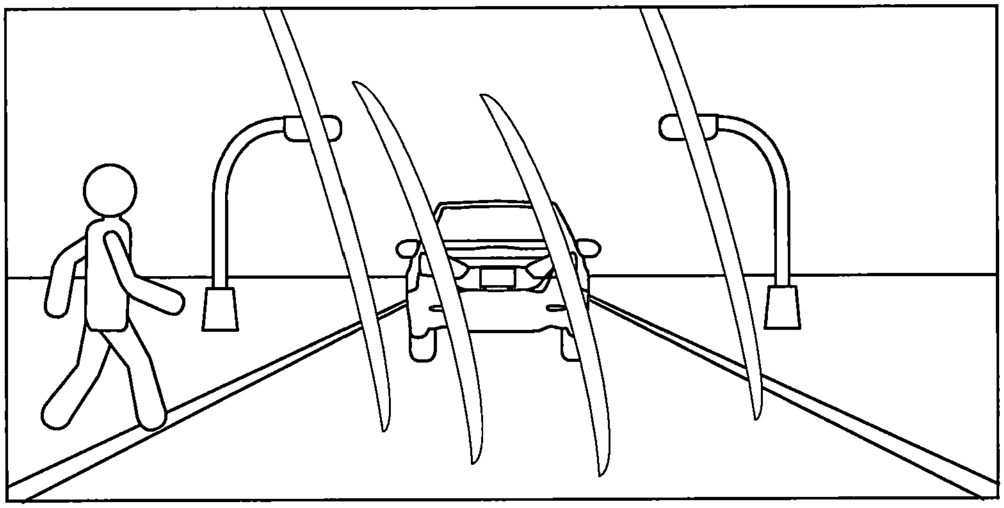
FIGS. 5A and 5B are diagrams each for explaining a binarized image according to an embodiment.

FIG. 5A illustrates an image before binarization processing is performed. The light streak candidate extraction unit 22 binarizes the image illustrated in FIG. 5A, with the luminance value of the detected light spot as a reference. Specifically, in a case where the luminance of the light spot is denoted by p and the binarization range of the luminance value is ±d, the pixel value is set to 1 when the luminance value of the pixel is greater than or equal to p-d and smaller than or equal to p+d, and the pixel value is set to 0 otherwise. As a result, the image can be binarized.

Figure 5B:
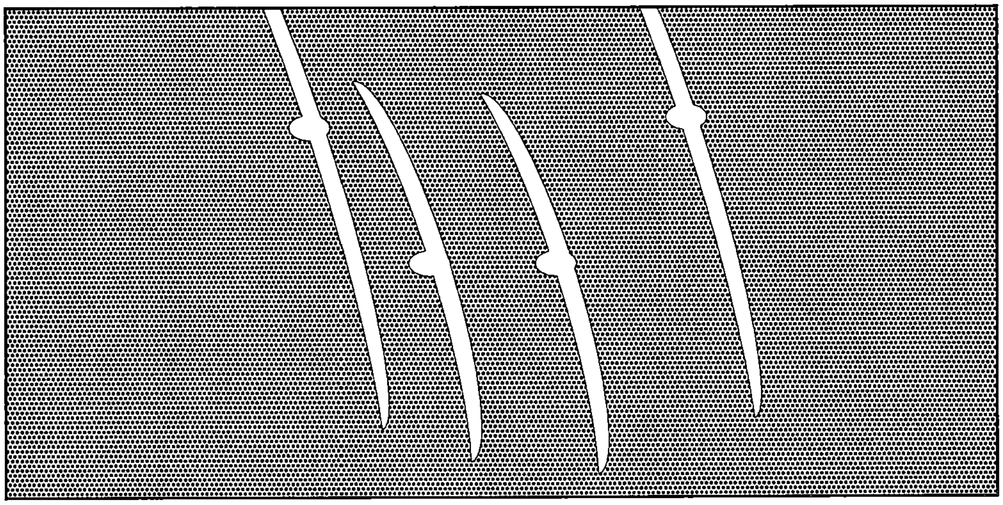

FIG. 5B illustrates an image after binarization processing is performed. As illustrated in FIG. 5B, in the image after the binarization processing is performed, the pixel value of light sources such as brake lamps and street lamps and light streak portions are 1 (white), and the pixel values of the other dark areas is 0 (black).

Referring back to FIG. 4, the description of the light streak detection processing will be continued. Next, the light streak candidate extraction unit 22 performs contour tracking processing on the binarized image, and cuts out an image of the light streak portion (S104). In the contour tracking processing, first, pixels are searched up and down or left and right from the position of the light spot, and a pixel whose pixel value switches from 1 to 0 is searched out. Then, the contour tracking processing is performed again, with the pixel whose pixel value switches from 1 to 0 as a reference.

In the contour tracking processing, the search can be performed by a known algorithm. The search in the contour tracking processing is performed while simultaneously updating the minimum and maximum values of the pixels in the vertical (Y-axis) and horizontal (X-axis) directions. When the contour tracking is completed, the light streak candidate extraction unit 22 cuts out a binarized image from the minimum and maximum values in the vertical and horizontal directions.

FIG. 6A illustrates an image on which the contour tracking processing has been performed. As illustrated in FIG. 6A, the contour of the light streak is detected in the image on which the contour tracking processing has been performed. FIG. 6B is an image of a light streak candidate obtained by cutting out the binarized image.

Referring back to FIG. 4, the description of the light streak detection processing will be continued. Next, the light streak candidate extraction unit 22 calculates an angle θ formed by the light spot with respect to each of all the spots whose pixel values are 1 except the light spot in the cut-out binarized image.

Figure 7:
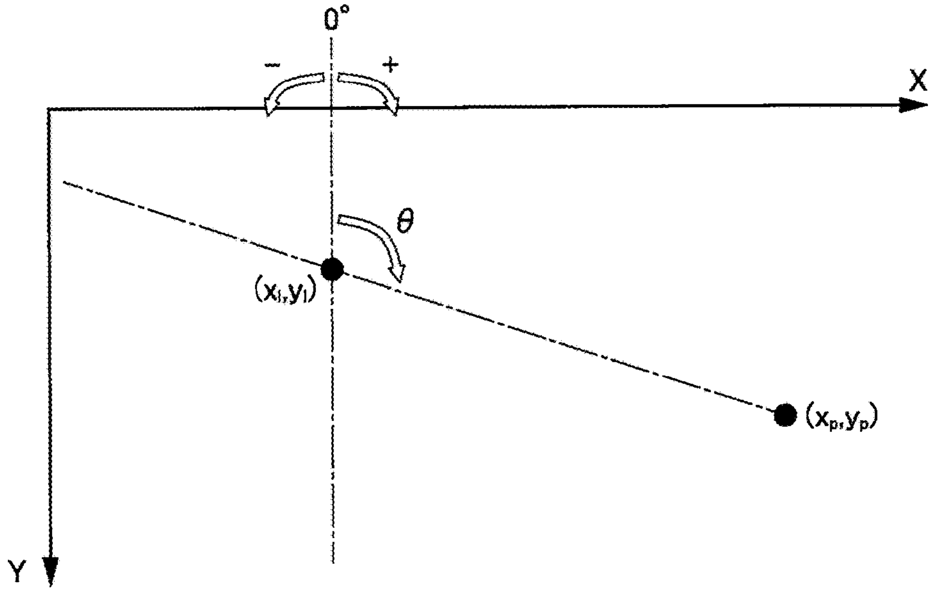
FIG. 7 is an image diagram illustrating an angle of a search spot with respect to a light spot according to an embodiment.

FIG. 7 is an image diagram illustrating an angle of a search spot with respect to a light spot. That is, FIG. 7 illustrates an angle θ between the light spot and the search spot. In a case where coordinates of a light spot on an image are defined as (xi,yi), and coordinates of a spot for which an angle is to be calculated are defined as (xp,yp), the angle θ [deg] is calculated by Formula (1). Meanwhile, θ is 0≤θ<180.

[Mathematical formula 1]

$$\theta = \tan^{-1}\frac{x_i - x_p}{yp - y_i} \tag{1}$$

For example, when right and left brake lamps of a preceding vehicle are present in one cut-out binarized image (light streak candidate), two light sources are present in one light streak candidate. In this manner, in a case where another light spot other than the target light spot exists in one light streak candidate, the angle of the search spot cannot be correctly calculated. Therefore, in a case where there are two or more light spots in the cut-out binarized image, the angle of the search spot is not calculated. That is, the cut-out binarized image is excluded from light streak candidates, and it is not determined whether the cut-out binarized image is a light streak.

Figure 8:
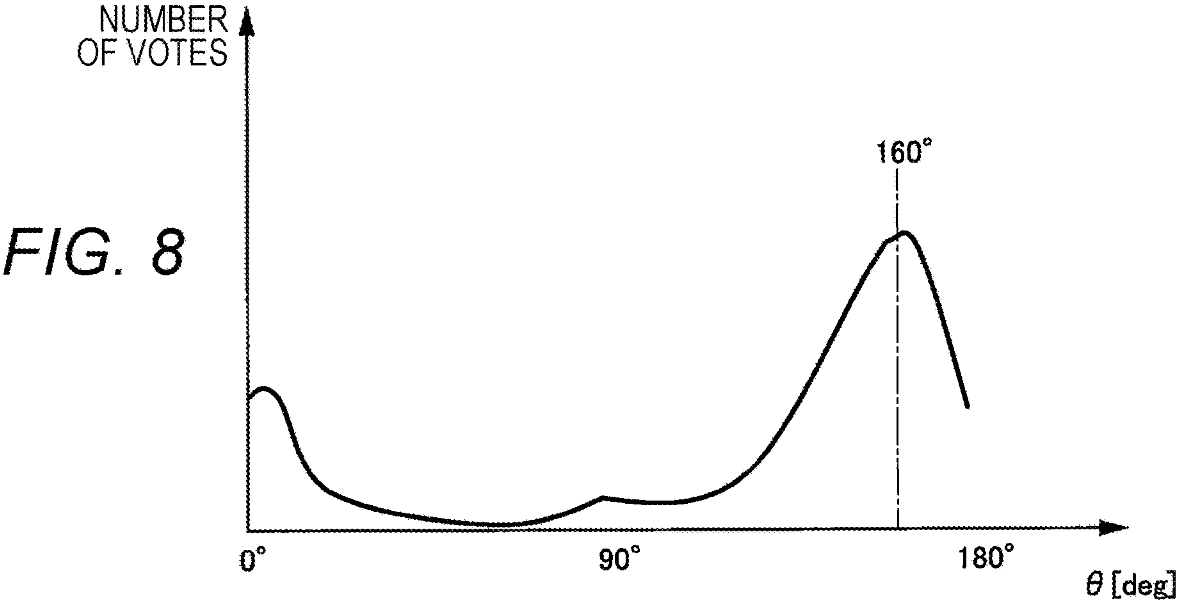
FIG. 8 is a diagram illustrating an angle voting result according to an embodiment.

FIG. 8 is a diagram illustrating a result of angle voting. As illustrated in FIG. 8, by performing the angle calculation according to the above Formula (1) with respect to all the spots (search spots) whose pixel values are 1 except the light spot, it is possible to acquire a voting result with an angle on the horizontal axis and the number of votes on the vertical axis.

In the voting result, the angle with the largest number of votes is an angle of a straight line (light streak candidate straight line) that is a light streak candidate. Whether this light streak candidate straight line is a light streak is determined by perform processing to be described later. The light streak caused by the portion that is not wiped by the wipers has an arc shape, but can be approximated to a straight line on the image. Therefore, the light streak candidate is approximated to a straight line, with the light spot as the center, to determine whether the light streak candidate is a light streak.

Figure 9:
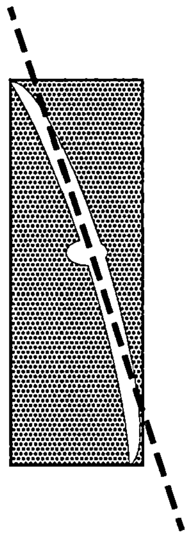
FIG. 9 is a diagram in which a straight line is drawn at an angle with the largest number of votes on a cut-out image according to an embodiment.

In the example illustrated in FIG. 8, the angle with the largest number of votes is 160 degrees. Therefore, in the subsequent processing, it is determined whether a straight line (light streak candidate straight line) of 160 degrees passing through the light spot is a light streak. FIG. 9 is a diagram in which a straight line is drawn at 160 degrees on a cut-out image.

In the present embodiment, in the angle voting processing, the range of the angle θ is set to 0≤θ<180. However, since the wiping angle of wipers generally does not change, the range of angles to be voted for may be narrowed down by learning using information from a plurality of frames (images). For example, when the angle is determined to be 100° stably over a plurality of frames (e.g., a plurality of images acquired for 10 seconds), the angle calculation is performed in the range of 80≤θ<130 instead of 0≤θ<180. As a result, the processing load can be reduced.

Furthermore, the angles to be voted for may be set by learning using information from a plurality of frames (images), and angles other than the set angles may not be voted for. As a result, the ratio of the largest number of votes (the number of votes for the angle) to the total number of votes increases. Therefore, the accuracy of the angle of the light streak candidate straight line can be enhanced by using the other auxiliary information (information from a plurality of frames (images)).

Referring back to FIG. 4, the description of the light streak detection processing will be continued. Next, the light streak presence/absence determination unit 23 performs light streak presence/absence determination processing (S106). In step S106, the light streak presence/absence determination unit 23 determines whether a light streak is generated by determining whether the light streak candidate straight line is point-symmetric about the light spot. Then, the light streak presence/absence determination unit 23 outputs a determination result to the recognition unit 24.

It is determined whether a difference between a distance from the light spot to a spot farthest in the upward direction (or in the leftward direction) and a distance from the light spot to a spot farthest in the downward direction (or in the rightward direction) among spots whose pixel values are 1 on the light streak candidate straight line is smaller than or equal to a predetermined threshold (e.g., 10 pix).

When the difference between the distances from the light spot to the farthest spots is smaller than or equal to the threshold, the light streak presence/absence determination unit 23 determines that the light streak candidate straight line is point-symmetric about the light spot, and determines that a light streak is generated. On the other hand, when the difference between the distances from the light spot to the farthest spots is not smaller than or equal to the threshold, the light streak presence/absence determination unit 23 determines that the light streak candidate straight line is not point-symmetric about the light spot, and determines that no light streak is generated.

Note that, in the light streak presence/absence determination processing, it may be determined whether a light streak is generated, based on at least one of information regarding the light streak candidate such as a ratio of pixels whose pixel values are 1 to the entire cut-out image, a length of the cut-out image, a ratio of the number of votes for the angle to the total number of votes for the light streak candidate straight line, and a thickness of the light streak candidate straight line, and information regarding the vehicle 1 such as a speed of the vehicle 1 and whether wipers are used, in addition to whether the light streak candidate straight line is point-symmetric about the light spot. As a result, it is possible to suppress erroneous determination as to whether the light streak candidate is a light streak.

For example, when the ratio of pixels whose pixel values are 1 to the entire cut-out image is smaller than a predetermined value, there is a possibility that light may not extend in a streak shape. Therefore, when the ratio of pixels whose pixel values are 1 to the entire cut-out image is smaller than the predetermined value, the light streak presence/absence determination unit 23 determines that no light streak is generated.

In addition, when the cut-out image is smaller than a predetermined length (e.g., a square of 40 pix), symmetry (point symmetry) may be erroneously determined. Therefore, when the cut-out image is smaller than a predetermined size, the light streak presence/absence determination unit 23 determines that no light streak is generated.

In addition, when the light streak candidate straight line has a thickness greater than or equal to a predetermined specific value, the light streak candidate straight line is often a target such as a guide rail reflected by light, not a light streak. Therefore, when the light streak candidate straight line or the light streak candidate (cut-out image) has a thickness greater than or equal to the specific value, the light streak presence/absence determination unit 23 determines that no light streak is generated.

Next, the recognition unit 24 determines whether the determination result of the light streak presence/absence determination unit 23 indicates that there is a light streak (S107). When it is determined in step S107 that the determination result of the light streak presence/absence determination unit 23 indicates that there is a light streak (YES in S107), the recognition unit 24 adds "1" to a halt (HALT) occurrence counter (S108).

On the other hand, when it is determined in step S107 that the determination result of the light streak presence/absence determination unit 23 indicates that there is no light streak (NO in S107), the recognition unit 24 subtracts "1" from the halt occurrence counter (S109).

After the processing of step S108 or after the processing of step S109, the recognition unit 24 determines whether a counter value of the halt occurrence counter is greater than or equal to a reference value (S110). When it is determined in step S110 that the counter value of the halt occurrence counter is not larger than or equal to the reference value (NO in S110), the recognition unit 24 (the image processing device 20) ends the light streak detection processing.

On the other hand, when it is determined in step S110 that the counter value of the halt occurrence counter is larger than or equal to the reference value (YES in S110), the recognition unit 24 outputs a driving assistance function halt (HALT) command to the vehicle control device 30 (S111). When receiving the driving assistance function halt command, the vehicle control device 30 halts the driving support function. After the processing of step S111, the image processing device 20 ends the light streak detection processing.

In addition, in a case where a plurality of light spots are detected in step S101, steps 103 to S106 are performed for each of the detected light spots. Note that, as described above, in a case where there are two or more light spots in a light streak candidate, it is not determined whether the light streak candidate is a light streak.

In the present embodiment, the driving assistance functions are halted when light streaks have been generated in a predetermined number (reference value or more) of frames (images). The predetermined number (reference value or more) may be changed, for example, depending on the speed of the vehicle 1. In addition, the image processing device (recognition unit) according to the present invention may output a driving assistance function halt command when a light streak has been generated in one frame (image).

The image processing device 20 according to the present embodiment determines whether the light streak candidate straight line is a light streak by determining whether the light streak candidate straight line extends point-symmetrically in the vertical or horizontal direction with respect to the light spot. As a result, it is possible to determine whether the light streak candidate is a light streak regardless of the direction in which the light streak candidate extends. Therefore, it is possible to detect not only a light streak caused by dirt in a portion that is not wiped by the wipers but also a light streak resulting from a scratch on the windshield or a portion that is not wiped by something other than the wipers.

Note that, in the present embodiment, it is determined whether a light streak has been generated by determining whether the light streak candidate straight line extends point-symmetrically. However, the image processing device according to the present invention is not limited to determining whether a light streak has been generated using a light streak candidate straight line. The image processing device according to the present invention may determine that the light streak candidate is a light streak when a difference in angle between a portion extending from the light spot to one side of the light streak candidate and a portion extending from the light spot to the other side of the light streak candidate is within a predetermined range. That is, even if the light streak candidate does not satisfy the symmetry in which the distances from the light spot are substantially equal, it is possible to determine whether the light streak candidate is a light streak.

For example, the image processing device according to the present invention may detect a first spot and a second spot between which a light spot is sandwiched from a light streak candidate (an image obtained by cutting out a binarized image), and determine that a light streak has been generated when a difference between an angle of a line connecting the first spot and the light spot and an angle of a line connecting the second spot and the light spot is within a predetermined range. In this case, the first spot may be set to a spot farthest in the upward direction (or in the leftward direction) from the light spot, and the second spot may be set to a spot farthest in the downward direction (or in the rightward direction) from the light spot.

2. Summary (1) The image processing device 20 according to the above-described embodiment includes a light spot detection unit 21, a light streak candidate extraction unit 22, and a light streak presence/absence determination unit 23. The light spot detection unit 21 detects a light spot having a luminance value larger than or equal to a predetermined value from an image acquired by the in-vehicle camera 10 mounted in the vehicle 1. The light streak candidate extraction unit 22 extracts a light streak candidate extending from the light spot detected by the light spot detection unit 21. The light streak presence/absence determination unit 23 determines that the light streak candidate is a light streak when a difference in angle between a portion of the light streak candidate extending from the light spot to one side and a portion of the light streak candidate extending from the light spot to the other side is within a predetermined range.

As a result, it is possible to determine whether the light streak candidate is a light streak regardless of the direction in which the light streak candidate extends. As a result, it is possible to detect not only a light streak resulting from a portion that is not wiped by the wipers but also a light streak resulting from a scratch on the windshield or a portion that is not wiped by something other than the wipers. In addition, it is not necessary to set the direction in which a light streak extends for each vehicle that is different in the wiping direction of the wipers, and the present invention can be applied to various vehicles.

(2) In addition, the light streak presence/absence determination unit 23 according to the above-described embodiment determines that the light streak candidate is a light streak when the light streak candidate is point-symmetric about the light spot.

As a result, the accuracy of the determination of the light streak can be enhanced.

(3) In addition, the light streak candidate extraction unit 22 according to the above-described embodiment performs binarization processing of binarizing an area whose luminance value is close to the luminance value of the light spot and the other area, and contour tracking processing of searching for a pixel whose pixel value switches in an image obtained by the binarization processing and performing contour tracking on the area whose luminance value is close to the luminance value of the light spot. In addition, the light streak candidate extraction unit 22 performs cutting-out processing of creating a cut-out image of the light streak candidate from a result of the contour tracking, and angle voting processing of obtaining an angle $\theta$ of the light streak candidate within a range of $0 \leq \theta < 180$.

As a result, the light streak presence/absence determination unit 23 can easily determine whether the light streak candidate is point-symmetric about the light spot.

(4) In addition, the light streak presence/absence determination unit 23 according to the above-described embodiment determines whether a light streak candidate straight line obtained by the angle voting processing is point-symmetric about the light spot.

As a result, by calculating distances from both ends of the light streak candidate straight line to the light spot, it is possible to easily determine whether the light streak candidate straight line is point-symmetric.

(5) In addition, in a case where there are two or more light spots in the light streak candidate according to the above-described embodiment, the angle voting processing is not performed, and it is not determined whether the light streak candidate is a light streak.

As a result, it is possible to prevent erroneous detection of the angle of the light streak candidate.

(6) In addition, the light streak presence/absence determination unit 23 according to the above-described embodiment learns a target angle of the light streak, and narrows down the range of the angle $\theta$ of the light streak candidate.

As a result, the processing load of the image processing device can be reduced.

(7) In addition, the light streak presence/absence determination unit 23 according to the above-described embodiment determines whether the light streak candidate is a light streak in consideration of at least one of information regarding the light streak candidate and information regarding the vehicle 1.

As a result, it is possible to suppress erroneous determination as to whether the light streak candidate is a light streak.

(8) In addition, the light streak presence/absence determination unit 23 according to the above-described embodiment determines that the light streak candidate is not a light streak when the light streak candidate has a thickness larger than or equal to a predetermined specific value.

As a result, it is possible to prevent a target that is not a light streak from being erroneously detected as a light streak.

(9) In addition, the light streak presence/absence determination unit 23 according to the above-described embodiment detects a first spot and a second spot located with the light spot being sandwiched therebetween from the light streak candidate, and determines that the light streak candidate is a light streak when a difference between an angle of a line connecting the first spot and the light spot and an angle of a line connecting the second spot and the light spot is within a predetermined range.

As a result, it is possible to determine whether the light streak candidate is a light streak without obtaining a light streak candidate straight line.

(10) In the image processing method according to the above-described embodiment, the light spot detection unit 21 detects a light spot having a luminance value larger than or equal to a predetermined value from an image acquired by the in-vehicle camera 10 mounted in the vehicle 1. In addition, the light streak candidate extraction unit 22 extracts a light streak candidate extending from the light spot detected by the light spot detection unit 21. Then, the light streak presence/absence determination unit 23 determines that the light streak candidate is a light streak when a difference in angle between a portion of the light streak candidate extending from the light spot to one side and a portion of the light streak candidate extending from the light spot to the other side is within a predetermined range.

As a result, it is possible to determine whether the light streak candidate is a light streak regardless of the direction in which the light streak candidate extends. As a result, it is possible to detect not only a light streak resulting from a portion that is not wiped by the wipers but also a light streak resulting from a scratch on the windshield or a portion that is not wiped by something other than the wipers. In addition, it is not necessary to set the direction in which a light streak extends for each vehicle that is different in the wiping direction of the wipers, and the present invention can be applied to various vehicles.

The present invention is not limited to the embodiment described above and illustrated in the drawings, and various modifications can be made without departing from the gist of the invention set forth in the claims.

In addition, the above-described embodiment has been described in detail in order to describe the present invention in an easy-to-understand manner, and is not necessarily limited to having all the configurations described above. In addition, a part of the configuration of one embodiment may be replaced with the configuration of another embodiment, and the configuration of one embodiment may be added to the configuration of another embodiment. In addition, a part of the configuration of each embodiment can be added to, deleted from, or replaced with another configuration.

In the present specification, words such as “parallel” and “orthogonal” are used, but these words do not mean only “parallel” and “orthogonal” in the strict sense, and may also mean “substantially parallel” or “substantially orthogonal”, including “parallel” and “orthogonal”, as long as their functions can be exhibited.

REFERENCE SIGNS LIST

1 vehicle
10 in-vehicle camera
11 left camera
12 right camera
20 image processing device
21 light spot detection unit
22 light streak candidate extraction unit
23 light streak presence/absence determination unit
24 recognition unit
30 vehicle control device
100 windshield
101 wiper

The invention claimed is:

1. An image processing device comprising:

a light spot detection unit that detects a light spot having a luminance value larger than or equal to a predetermined value from an image acquired by a camera mounted in a vehicle;

a light streak candidate extraction unit that extracts a light streak candidate extending from the light spot detected by the light spot detection unit; and a light streak presence/absence determination unit that determines that the light streak candidate is a light streak when a difference in angle between a portion of the light streak candidate extending from the light spot to one side and a portion of the light streak candidate extending from the light spot to the other side is within a predetermined range.

2. The image processing device according to claim 1, wherein the light streak presence/absence determination unit determines that the light streak candidate is a light streak when the light streak candidate is point-symmetric about the light spot.

3. The image processing device according to claim 2, wherein the light streak candidate extraction unit performs:

binarization processing of binarizing an area whose luminance value is close to the luminance value of the light spot and the other area;

contour tracking processing of searching for a pixel whose pixel value switches in an image obtained by the binarization processing and performing contour tracking on the area whose luminance value is close to the luminance value of the light spot;

cutting-out processing of creating a cut-out image of the light streak candidate from a result of the contour tracking; and angle voting processing of obtaining an angle θ of the light streak candidate within a range of $0 \leq \theta < 180$.

4. The image processing device according to claim 3, wherein the light streak presence/absence determination unit determines whether a light streak candidate straight line obtained by the angle voting processing is point-symmetric about the light spot.

5. The image processing device according to claim 3, wherein in a case where there are two or more light spots in the light streak candidate, the angle voting processing is not performed, and it is not determined whether the light streak candidate is a light streak.

6. The image processing device according to claim 3, wherein the light streak presence/absence determination unit learns a target angle of the light streak, and narrows down the range of the angle θ of the light streak candidate.

7. The image processing device according to claim 1, wherein the light streak presence/absence determination unit determines whether the light streak candidate is a light streak in consideration of at least one of information regarding the light streak candidate and information regarding the vehicle.

8. The image processing device according to claim 1, wherein the light streak presence/absence determination unit determines that the light streak candidate is not a light streak when the light streak candidate has a thickness larger than or equal to a predetermined specific value.

9. The image processing device according to claim 1, wherein the light streak presence/absence determination unit detects a first spot and a second spot located with the light spot being sandwiched therebetween from the light streak candidate, and determines that the light streak candidate is a light streak when a difference between an angle of a line connecting the first spot and the light spot and an angle of a line connecting the second spot and the light spot is within a predetermined range.

10. An image processing method comprising:

detecting a light spot having a luminance value larger than or equal to a predetermined value from an image acquired by a camera mounted in a vehicle by a light spot detection unit;

extracting a light streak candidate extending from the light spot detected by the light spot detection unit by a light streak candidate extraction unit; and determining that the light streak candidate is a light streak when a difference in angle between a portion of the light streak candidate extending from the light spot to one side and a portion of the light streak candidate extending from the light spot to the other side is within a predetermined range by a light streak presence/absence determination unit.

* * * * *